US011978473B1

(12) United States Patent
Samuels et al.

(10) Patent No.: US 11,978,473 B1
(45) Date of Patent: May 7, 2024

(54) AUDIO CLASSIFICATION SYSTEM

(71) Applicants: Christopher Samuels, Ferndale, MI (US); Ghazaleh Jowkar, Seattle, WA (US); Mohammadbagher Fotouhi, Seattle, WA (US); Anita Garic, Imotski (HR); Ivan Vican, Imotski (HR)

(72) Inventors: Christopher Samuels, Ferndale, MI (US); Ghazaleh Jowkar, Seattle, WA (US); Mohammadbagher Fotouhi, Seattle, WA (US); Anita Garic, Imotski (HR); Ivan Vican, Imotski (HR)

(73) Assignee: Bace Technologies LLC, Ferndale, MI (US)

( * ) Notice: Subject to any disclaimer, the term of this patent is extended or adjusted under 35 U.S.C. 154(b) by 86 days.

(21) Appl. No.: 17/577,746

(22) Filed: Jan. 18, 2022

Related U.S. Application Data

(60) Provisional application No. 63/138,558, filed on Jan. 18, 2021.

(51) Int. Cl.
*G10L 25/24* (2013.01)
*G10L 25/30* (2013.01)

(52) U.S. Cl.
CPC .............. *G10L 25/24* (2013.01); *G10L 25/30* (2013.01)

(58) Field of Classification Search
CPC ................................ G10L 25/24; G10L 25/30
USPC .......................................................... 704/231
See application file for complete search history.

(56) References Cited

U.S. PATENT DOCUMENTS

2009/0306797 A1* 12/2009 Cox ...................... G06F 16/683 707/E17.103
2014/0341395 A1* 11/2014 Matsumoto .............. H03G 3/20 381/107
2020/0035222 A1* 1/2020 Sypniewski ........... G06N 3/044
2020/0380940 A1* 12/2020 Abdallah ............. G10H 1/0066

OTHER PUBLICATIONS

Q. Ding and N. Zhang, "Classification of Recorded Musical Instruments Sounds Based on Neural Networks," 2007 IEEE Symposium on Computational Intelligence in Image and Signal Processing, Honolulu, HI, USA, 2007, pp. 157-162, doi: 10.1109/CIISP.2007.369310. (Year: 2007).*

* cited by examiner

*Primary Examiner* — Bharatkumar S Shah

(57) ABSTRACT

A system includes a computer including a processor and a memory. The memory includes instructions such that the processor is programmed to receive an audio input representing a percussion performed by a user and classify, at a trained neural network, the audio input as a particular musical type.

14 Claims, 8 Drawing Sheets

AUDIO CLASSIFICATION SYSTEM

BACKGROUND

Neural networks are machine learning models that employ one or more layers of models to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

A system includes a computer including a processor and a memory. The memory includes instructions such that the processor is programmed to receive an audio input representing a percussion performed by a user and classify, at a trained neural network, the audio input as a particular musical type.

In other features, the trained neural network maps audio input sequences representing the percussion to target musical instrument sequences.

In other features, the trained neural network comprises a convolutional neural network.

In other features, the convolutional neural network comprises at least one dropout layer.

In other features, a number of inputs within an input layer of the convolutional neural network is equal to a number of recorded sounds corresponding to the audio input.

In other features, the number of inputs comprises at least two, wherein a first input of the at least two inputs corresponds to audio input representing a kick and a second input of the at least two inputs corresponds to audio input representing a snare.

In other features, the processor is further programmed to receive the audio input from a microphone.

In other features, the processor is further programmed to perform audio envelope detection on the audio input prior to classification of the audio input.

In other features, the trained neural network is configured to transform the audio input into corresponding images, wherein the trained neural network is configured to classify the corresponding images into a particular musical type.

In other features, the trained neural network is configured to use Frequency Cepstral Coefficient (MFCC) feature extraction layers to transform the audio input into the corresponding images.

A method is disclosed that includes receiving an audio input representing a percussion performed by a user and classifying, at a trained neural network, the audio input as a particular musical type.

In other features, the trained neural network maps audio input sequences representing the percussion to target musical instrument sequences.

In other features, the trained neural network comprises a convolutional neural network.

In other features, the convolutional neural network comprises at least one dropout layer.

In other features, a number of inputs within an input layer of the convolutional neural network is equal to a number of recorded sounds corresponding to the audio input.

In other features, the number of inputs comprises at least two, wherein a first input of the at least two inputs corresponds to audio input representing a kick and a second input of the at least two inputs corresponds to audio input representing a snare.

In other features, the method further includes receiving the audio input from a microphone.

In other features, the method further includes performing audio envelope detection on the audio input prior to classification of the audio input.

In other features, the method further includes transforming the audio input into corresponding images, wherein the trained neural network is configured to classify the corresponding images into a particular musical type.

In other features, the trained neural network is configured to use Frequency Cepstral Coefficient (MFCC) feature extraction layers to transform the audio input into the corresponding images.

Further areas of applicability will become apparent from the description provided herein. It should be understood that the description and specific examples are intended for purposes of illustration only and are not intended to limit the scope of the present disclosure.

DRAWINGS

DETAILED DESCRIPTION

Vocal percussion, e.g., beatboxing, can involve mimicking one or more musical instruments, such as a drum machine, via a user's mouth, lips, tongue, and/or voice. The vocal percussion may correspond to a particular type of drum sound, such as output corresponding to a bass drum, corresponding to a snare drum, output corresponding to a hi-hat, output corresponding to a closed hat, or the like.

Figure 1:
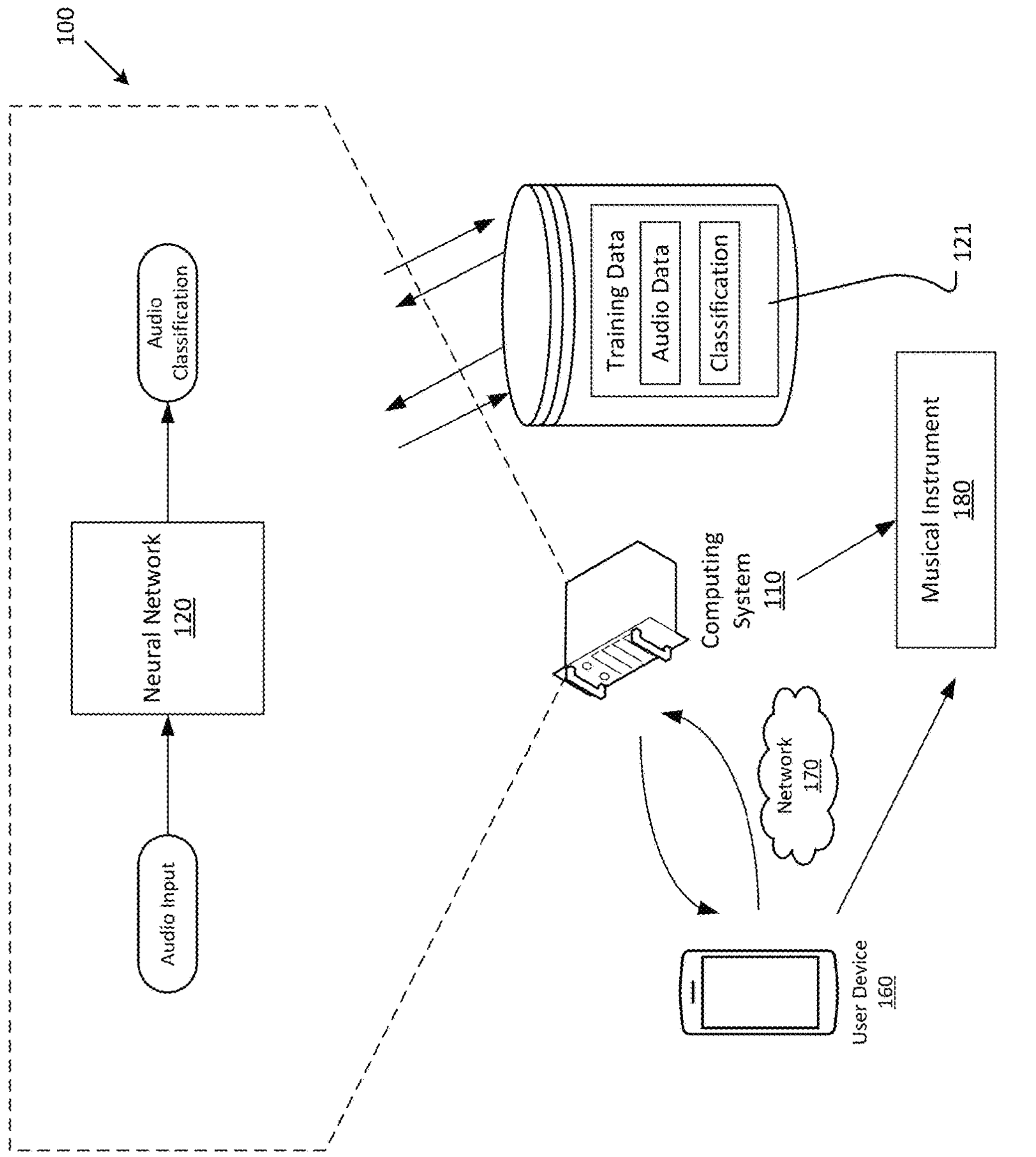
FIG. 1 is a diagram of an example system for audio classification.

FIG. 1 is a diagram of an example of a system 100 for training and using a musical classification system. The system 100 includes a computing system 110, which can represent one or more computers, e.g., servers, which may be at a single location or distributed over multiple locations. FIG. 1 illustrates the computing system 110 training a neural network 120, such as a deep neural network, from a set of training data 121 as discussed in greater detail below. The computing system 110 then uses the trained neural network 120 to perform musical instrument recognition for audio input provided by a user device 160 over a network 170.

The trained neural network 120 is a system that can be trained end-to-end to map audio input sequences to target musical instrument sequences. The input sequence can be a sequence of vectors that each represent a different frame of audio data (e.g., representing 25 milliseconds of audio, or another amount of audio). Each input vector can indicate audio input for the corresponding time period of an audio segment. The output can be a prediction representing a classification of the corresponding audio input. In an example implementation, the trained neural network 120 may generate a prediction representing a classification of the vocal percussion. For example, the trained neural network 120 may receive audio input representing a vocal percussion and may output a prediction indicating that the audio input is classified as corresponding to a snare drum audio sound, a bass drum audio sound, or the like.

In some example implementations, the user device 170 may provide the audio input to the computing system 110 for classification. In these implementations, the computing system 110 maintains the neural network 120 and provides the classification to the user device 160 via the network 170. In other example implementations, the trained neural network 120 may reside in the memory of the user device 160 such that the audio input classification may be accomplished locally.

Based on the audio classification, a processor of the user device 170 and/or the computing system 110 may generate digital data representing musical notes and/or musical patterns. In an example implementation, the digital data may comprise Musical Instrument Digital Interface (MIDI) data. The digital data can be provided to a musical instrument 180, and the musical instrument 180 can produce audio corresponding to the digital data. For example, the trained neural network 120 generates an audio classification for audio input provided by a user. Based on the audio classification, digital data representing the musical notes and/or musical patterns corresponding to the audio classification is generated, and the musical instrument 180 generates audio the corresponds to the digital data. In an example implementation, the audio input may comprise percussive vocalized sounds, audio input representing percussion performed by a user's appendages, e.g., hands, feet, musical notes produced by user through humming or singing, and/or output note velocity. The corresponding generated audio may comprise audio signals representing percussive sounds, i.e., drum sounds, musical notes, and/or audio representing a musical note velocity.

Figure 2B:
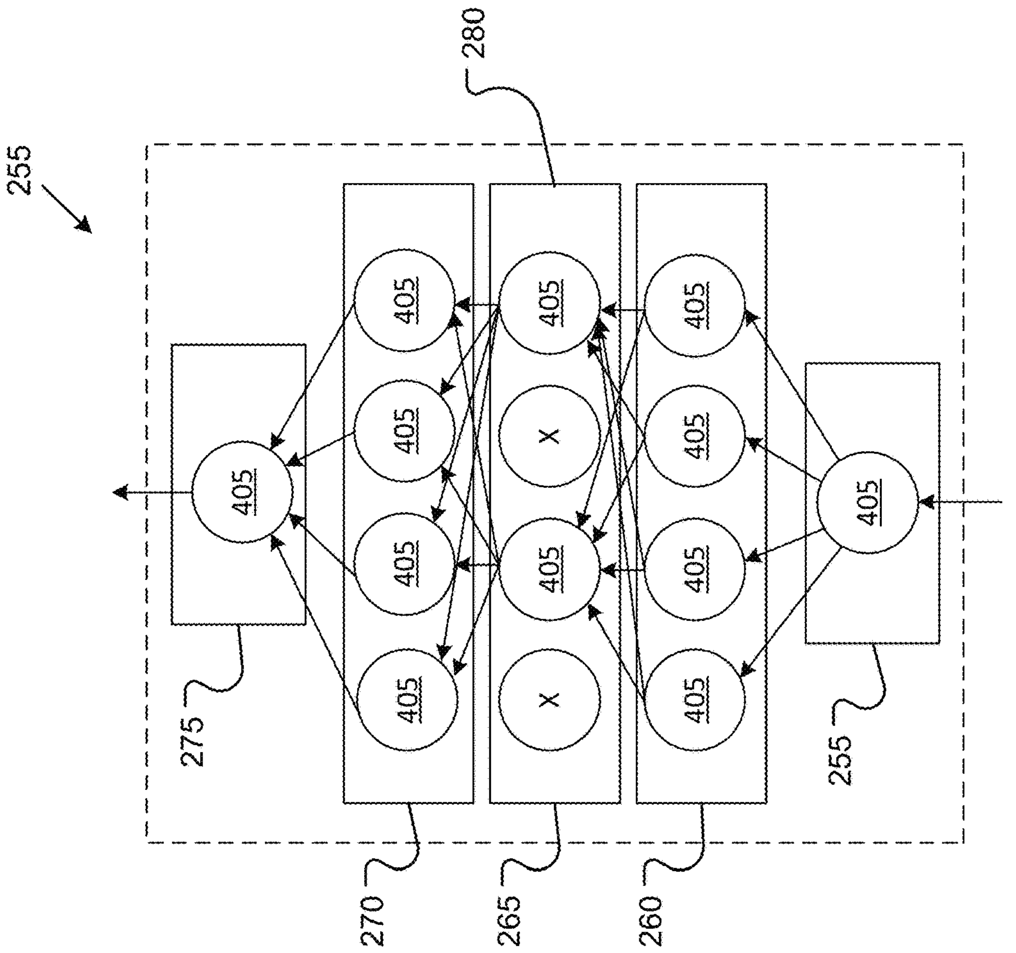
FIG. 2B is another example diagram of a deep neural network that classifies audio input signals.
Figure 2A:
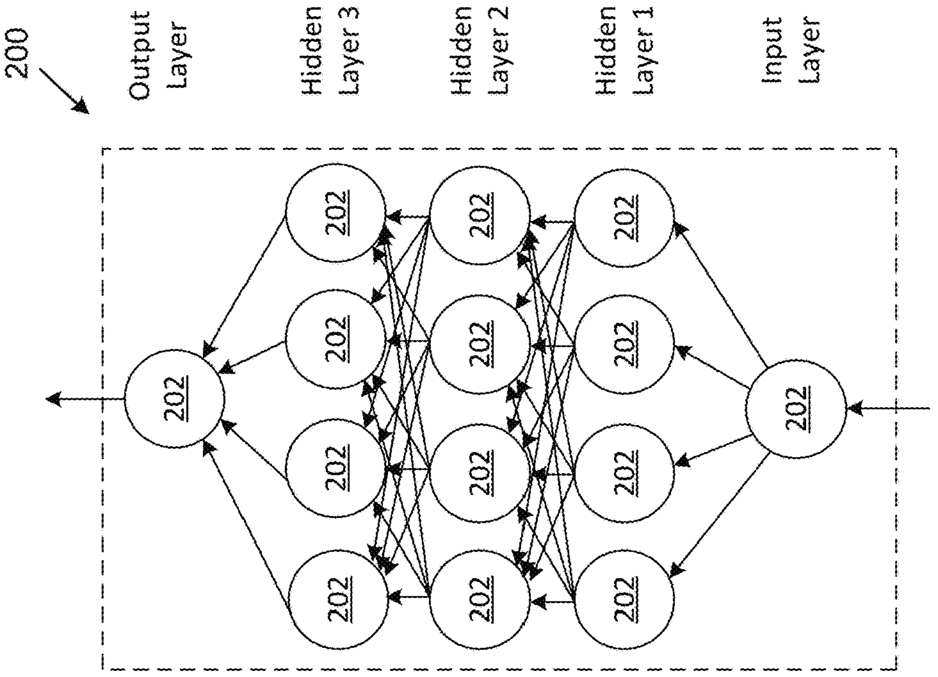
FIG. 2A is an example diagram of a deep neural network that classifies audio input signals.

FIG. 2A is a diagram of an example deep neural network (DNN) 200. The DNN 200 can be a software program that can be loaded in memory and executed by a processor included in computer 110, for example. In an example implementation, the DNN 200 can include, but is not limited to, a convolutional neural network (CNN), R-CNN (regions with CNN features), Fast R-CNN, and Faster R-CNN. The DNN includes multiple nodes, and the nodes are arranged so that the DNN 200 includes an input layer, one or more hidden layers, and an output layer. Each layer of the DNN 200 can include a plurality of nodes 202. While FIG. 2 illustrate three (3) hidden layers, it is understood that the DNN 200 can include additional or fewer hidden layers. The input and output layers may also include more than one (1) node 202.

The nodes 202 are sometimes referred to as artificial neurons 202, because they are designed to emulate biological, e.g., human, neurons. A set of inputs (represented by the arrows) to each neuron 202 are each multiplied by respective weights. The weighted inputs can then be summed in an input function to provide, possibly adjusted by a bias, a net input. The net input can then be provided to activation function, which in turn provides a connected neuron 205 an output. The activation function can be a variety of suitable functions, typically selected based on empirical analysis. As illustrated by the arrows in FIG. 2A, neuron 202 outputs can then be provided for inclusion in a set of inputs to one or more neurons 202 in a next layer.

The DNN 200 can accept audio as input and generate a one or more outputs, or predictions, based on the input. As discussed below, the predictions can comprise classifications of the audio input. The DNN 200 can be trained with ground truth data, i.e., data about a real-world condition or state. For example, the DNN 200 can be trained with ground truth data or updated with additional data by a processor of the computing system 110. Weights can be initialized by using a Gaussian distribution, for example, and a bias for each node 202 can be set to zero. Training the DNN 200 can including updating weights and biases via suitable techniques such as back-propagation with optimizations. Ground truth data can include, but is not limited to, classification labels corresponding to particular audio input.

FIG. 2B is a diagram of an example deep neural network (DNN) 250 that may be used to classify input, such as audio input. The DNN 200 includes multiple nodes 202, the input layer 255, hidden layers 260, 265, 270, and an output layer 275. As shown, hidden layer 265 comprises a dropout layer 280. The dropout layer 280 comprises a hidden layer in which one or more nodes 405 are deactivated. While only a single dropout layer 280 is illustrated, it is understood that the DNN 250 can include multiple dropout layers in some implementations to mitigate overfitting.

Figure 3:
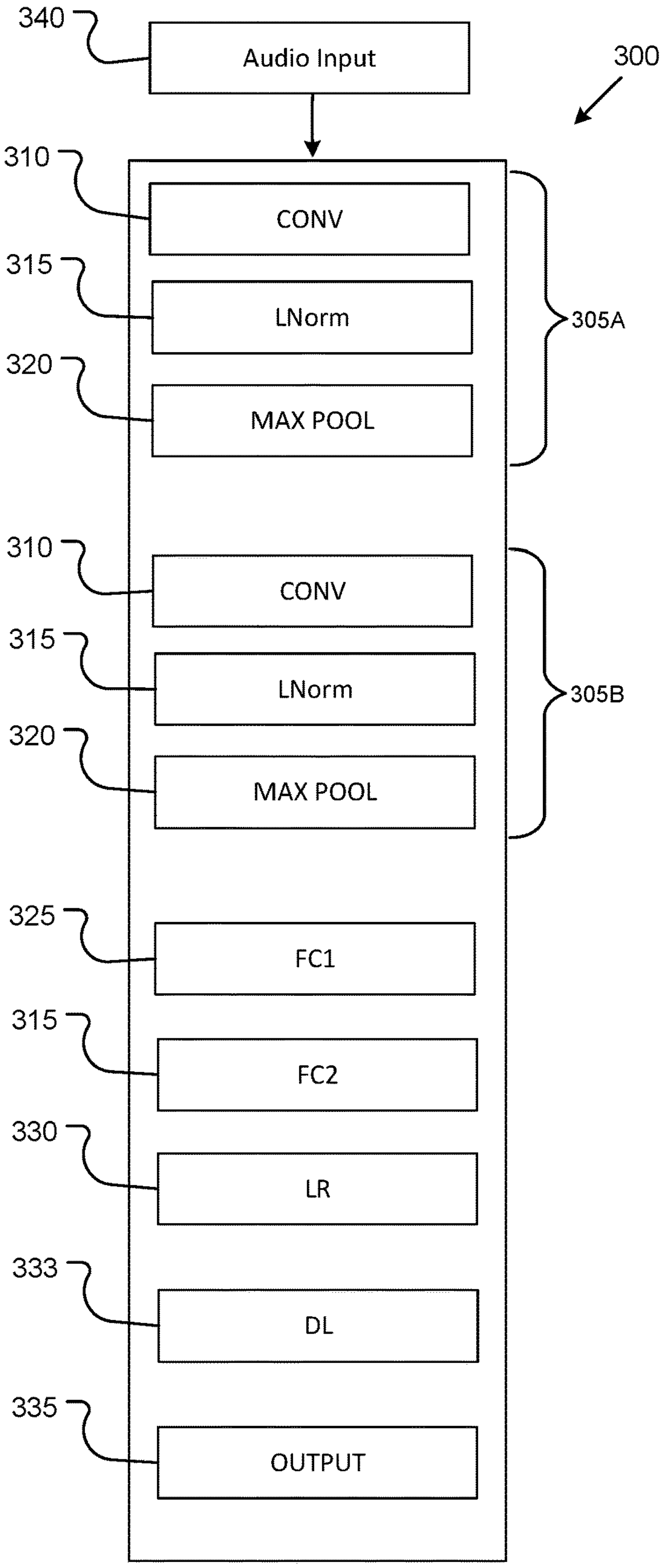
FIG. 3 is an example diagram of a convolutional neural network that classifies audio input signals.

FIG. 3 is a block diagram illustrating an example of an implementation of a DNN 200. In the implementation illustrated in FIG. 3, the DNN 200 is a convolutional neural network 300. The convolutional neural network 300 may include multiple different types of layers based on connectivity and weight sharing. As shown in FIG. 3, the convolutional neural network 300 includes convolution blocks 305A, 305B. Each of the convolution blocks 305A, 305B may be configured with a convolution layer (CONV) 310, a normalization layer (LNorm) 315, and a max pooling layer (MAX POOL) 320.

The convolution layers 310 may include one or more convolutional filters, which are be applied to the audio input data 340 to generate an output 335. While FIG. 3 illustrates only two convolution blocks 305A 305B, the present disclosure may include any number of the convolution blocks 305A, 305B. The normalization layer 315 may normalize the output of the convolution filters. For example, the normalization layer 315 may provide whitening or lateral inhibition. The max pooling layer 320 may provide down-sampling aggregation over space for local invariance and dimensionality reduction.

The convolutional neural network 300 may also include one or more fully connected layers 325 (FC1 and FC2). The convolutional neural network 300 may further include a logistic regression (LR) layer 330 and one or more dropout layers (DL) 333. Between each layer 310, 315, 320, 325, 330, 333 of the convolutional neural network 300 are weights that can be updated. The output of each of the layers (e.g., 310, 315, 320, 325, 330, 333) may serve as an input of a succeeding one of the layers (e.g., 310, 315, 320, 325, 330, 333) in the convolutional neural network 300 to learn object detections from the audio input data provided at the first of the convolution blocks 305A. The output 335 of the convolutional neural network 300 can represent a classification prediction based on the audio input data 340. The classification prediction can be defined as a probability of an audio input corresponding to a particular percussion sound, e.g., drum sound, kick sound, snare sound, etc.

In an example implementation, a trained DNN 200 can comprise at least one input layer, at least six hidden layers, and at least one output layer. During operation, the number of inputs in the input layer can be equal to the number of recorded sounds. For example, if a user records a kick, a snare, and an exp, the number of inputs comprises three. In an example implementation, the architecture of the DNN 200 can comprise an input layer, a first fully connected layer, an activation layer, i.e., tanh layer, a first dropout layer, a second fully connected layer, a second dropout layer, and a sigmoid output layer. A dropout rate for each of the dropout layers may be set to 0.25.

Figure 4A:
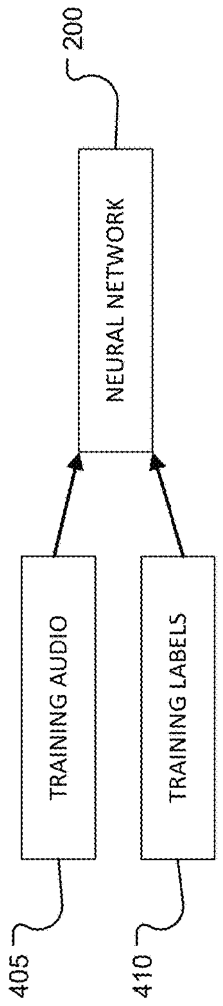
FIGS. 4A through 4C illustrate an example process for training a deep neural network.
Figure 4B:
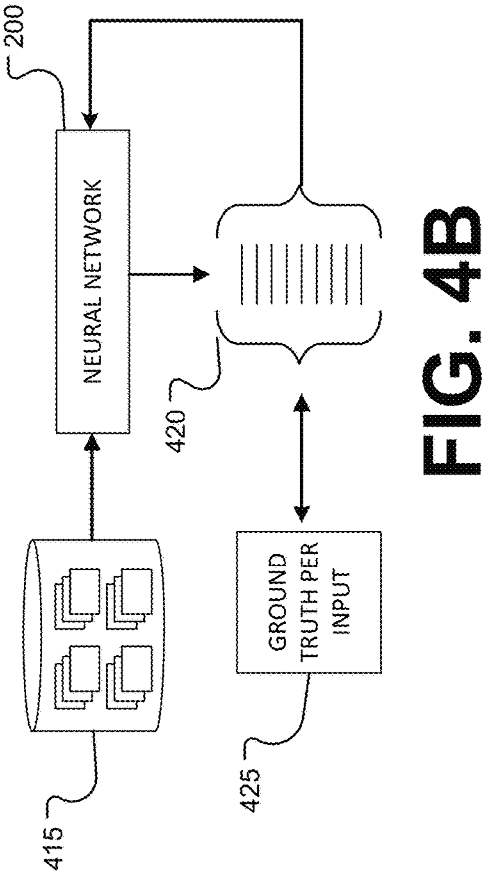

FIGS. 4A and 4B illustrate an example process for training one or more DNNs 200 for classifying an audio input. The one or more DNNs 200 may be implemented as a convolutional neural network, such as one or more convolutional neural networks 300, in accordance with one or more implementations of the present disclosure. FIG. 4A illustrates an initial training phase in which the DNN 200 receives a set of labeled audio inputs, e.g., in the form of training audio 405 and training labels 410 to initialize weights of the DNN 200. The training audio 405 may include audio segments that represent vocal percussion performed by a user. The training labels 410 may comprise labels indicating an audio classification for the vocal percussion. After the initial training phase, at a supervised training phase, a set of N testing audio inputs are provided to the DNN 200. The DNN 200 generates outputs indicative of a vocal percussion classification for each of the N testing audio inputs. The vocal percussion classification is a probability indicative of a vocal percussion type corresponding to the audio input.

FIG. 4B illustrates an example of generating output for one testing audio input 415, such as a non-labeled audio input. Based on the training using the testing audio input 415, the DNN 200 outputs a vector representation 420 of the obstruction classification. The vector representation 420 can be defined as a fixed length representation of the classification probabilities for each of the N testing audio inputs 415. The vector representation 420 is compared to the ground-truth data 425. The DNN 200 updates network parameters based on the comparison to the ground-truth boxes 425. For example, the network parameters, e.g., weights associated with the neurons, may be updated via back-propagation. Back-propagation is a technique that returns outputs from the DNN 200 to the input to be compared to ground truth corresponding to the N testing audio inputs 415. In this example, during training, a label and a vocal percussion classification probability can be backpropagated to be compared to the label and the vocal percussion classification probability included in the ground truth to determine a loss function. The loss function determines how accurately the DNN 200 has processed the DNN 200. The DNN 200 can be executed a plurality of times on a single testing audio input 415 while varying parameters that control the processing of the DNN 200. Parameters that correspond to correct answers as confirmed by a loss function that compares the outputs to the ground truth are saved as candidate parameters. Following the test runs, the candidate parameters that produce the most correct results are saved as the parameters that can be used to program the DNN 200 during operation.

Figure 4C:
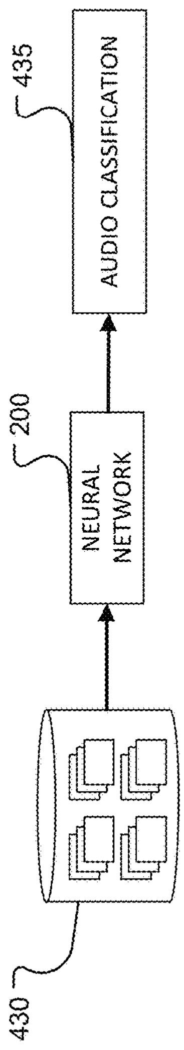

After training, the DNN 200 may be used by the user device 160 and/or the computing system 110 to classify audio inputs as shown in FIG. 4C. As discussed above with reference to FIG. 3, an output 435 of the DNN 200 can be a prediction indicating a classification probability of the vocal percussion. The output 435 can also be a prediction indicating a probability that the audio input is a particular vocal percussion type, e.g., bass drum output, snare drum output, etc. In some implementations, the audio input may be preprocessed via one or more suitable time-frequency transformation techniques.

Figure 5:
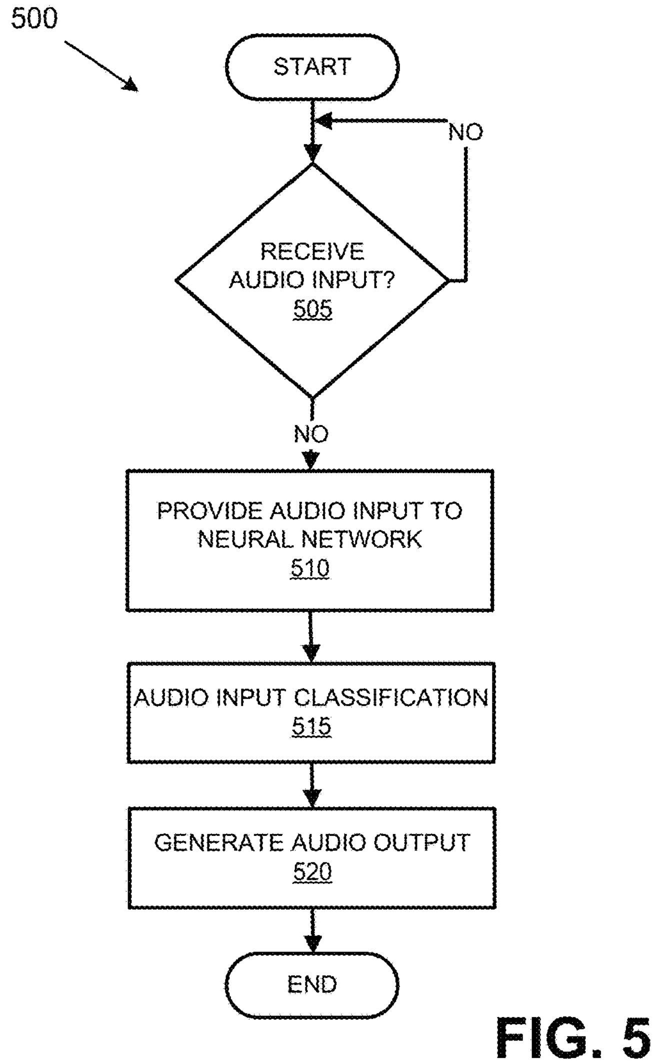
FIG. 5 is a flow diagram illustrating an example process for classifying an audio signal.

FIG. 5 is a flowchart of an exemplary process 500 for classifying audio input. Blocks of the process 500 can be executed by a processor of the computing system 110 and/or the user device 160. The process 500 begins at block 505 in which a determination is made whether an audio input has been received. For example, an input/output device, e.g., a microphone, may capture vocal percussion from a user and the processor of computing system 110 and/or the user device 160 can generate audio data representing the captured vocal percussion. If no audio input was received, the process 500 returns to block 505. Otherwise, the audio input, e.g., audio data, is provided to the neural network 200 at block 510. As discussed above, the audio input may be preprocessed via one or more suitable time-frequency transformation techniques.

At block 515, the trained neural network 200 classifies the audio input. For example, the audio input may be classified as a particular vocal percussion type. The vocal percussion type may be a particular type of drum sound, such as output corresponding to a bass drum, corresponding to a snare drum, output corresponding to a hi-hat, output corresponding to a closed hat, or the like. At block 520, a musical instrument 180, such as an electronic musical instrument, generates audio output based on the classified audio. For example, the computing system 110 and/or the user device 160 may generate digital data corresponding to the audio classification, and the digital data can be provided to the musical instrument 180 for audio output generation. The process 500 then ends.

Figure 6:
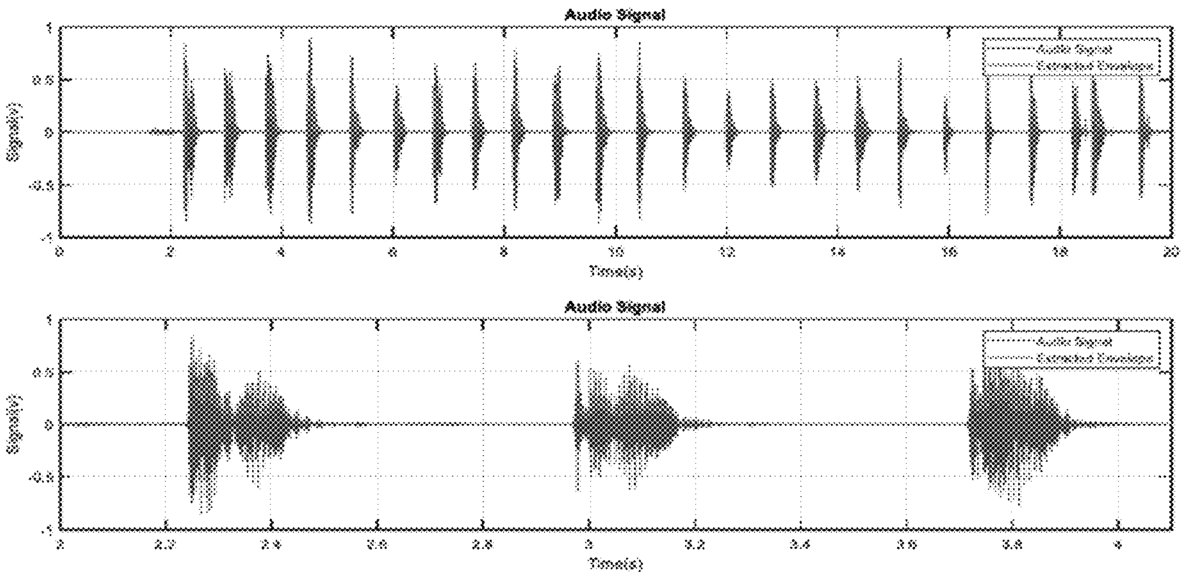
FIGS. 6 through 9 illustrate multiple diagrams for preprocessing an audio signal.
Figure 7:
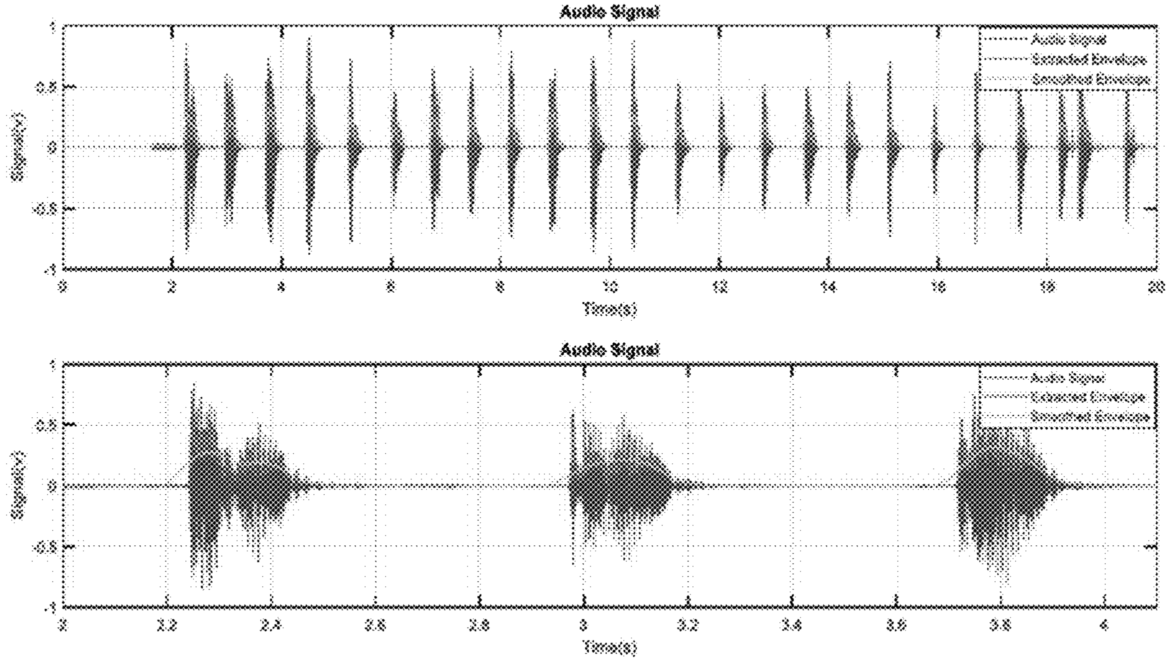
Figure 8:
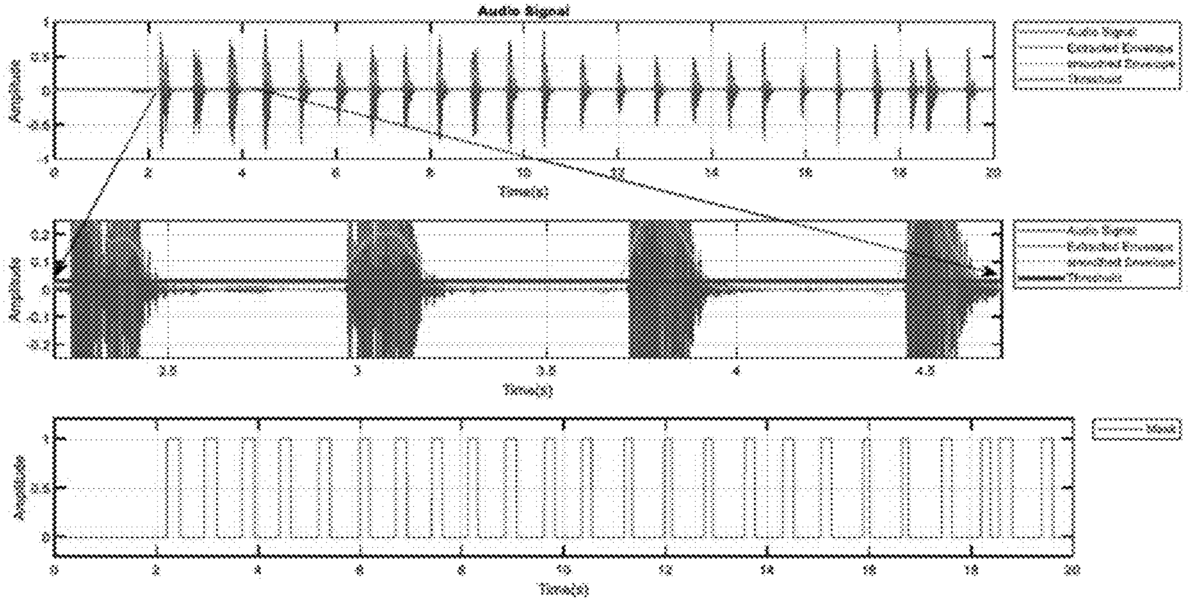
Figure 9:
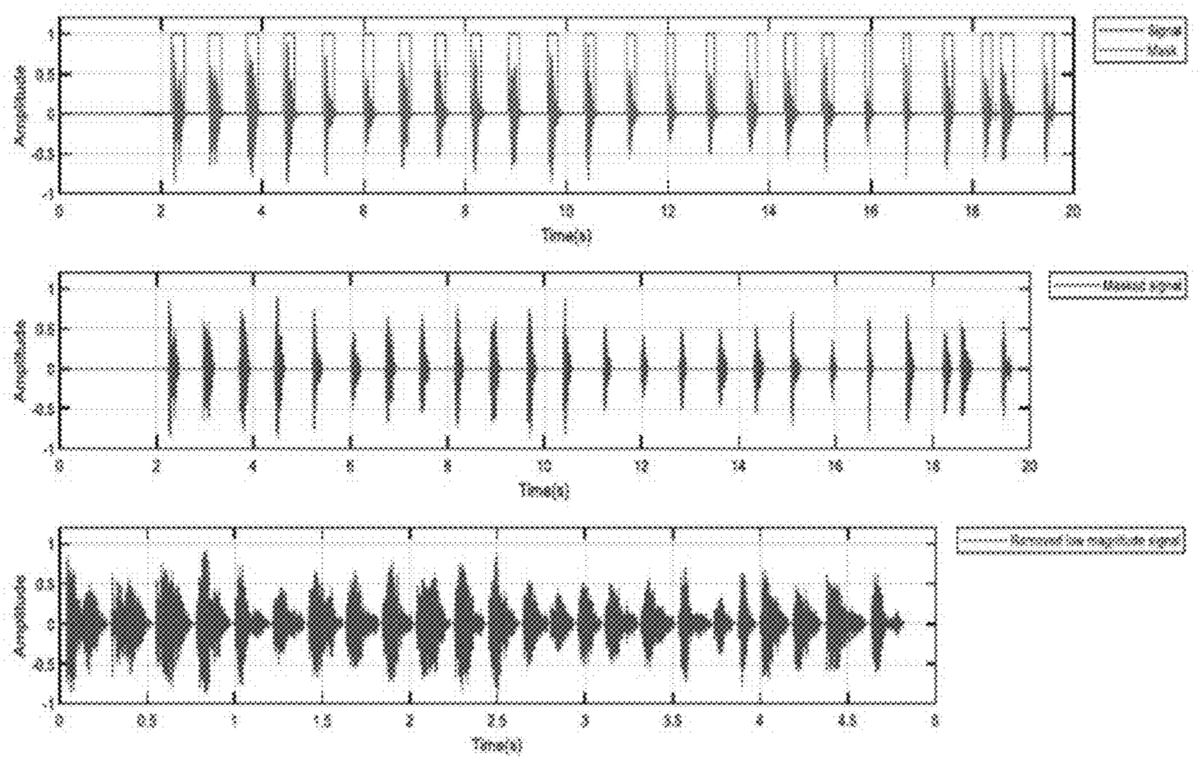

In one or more implementations, one or more suitable audio preprocessing techniques may be applied to the audio input. For example, a processor of the computing system 110 and/or the user device 160 may perform audio envelope detection, which may be a magnitude of the audio signal computed by a Hilbert function (see FIG. 6). The envelope of the audio signal may then be smoothed via a suitable moving average filter (see FIG. 7). The processor may then apply a thresholding process to the smoothed audio signal. A threshold parameter may be heuristically set according to equation 1:

$$Thr = \frac{\sum_{i=1}^{n} |\mathrm{SIGNAL}(i)|}{n}, \qquad \text{Equation 1}$$

where Thr represents the threshold parameter, SIGNAL represents the smoothed audio signal at the ith iteration, and n represents the number of audio signal samples. Referring to FIGS. 8 and 9, each audio signal sample can be compared to the threshold parameter, e.g., a mask, and the audio signal samples that are greater than the threshold parameter are set to "1" and audio signal samples less than the threshold parameter are set to "0".

Figure 10:
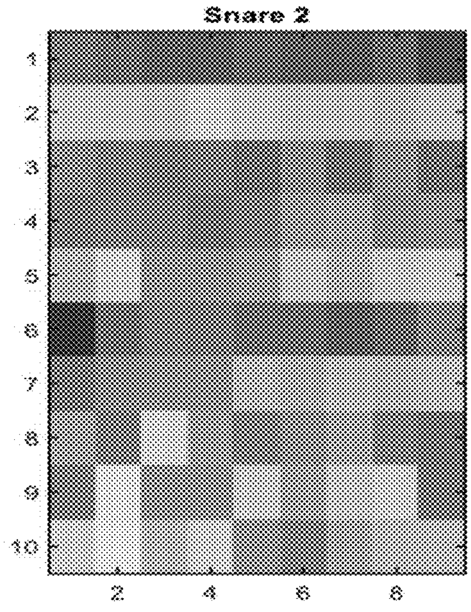
FIGS. 10 and 11 illustrate a feature extraction map for a snare audio output.
Figure 11:
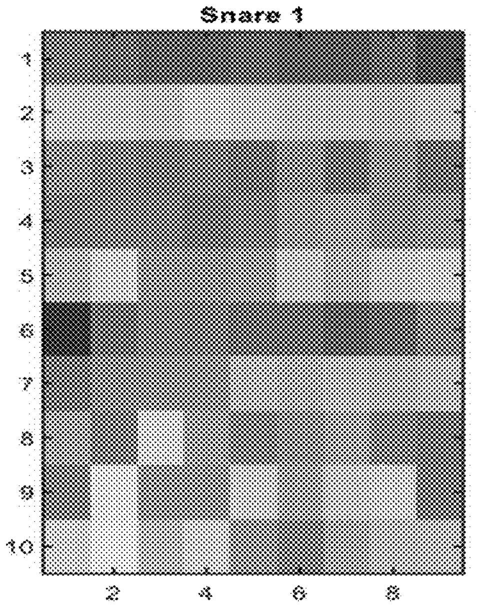
Figure 12:
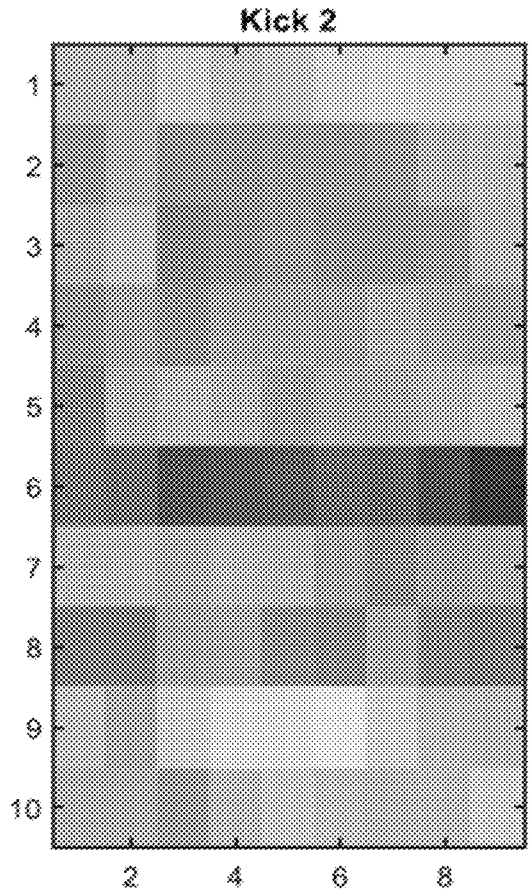
FIGS. 12 and 13 illustrate a feature extraction map for a kick audio output.
Figure 13:
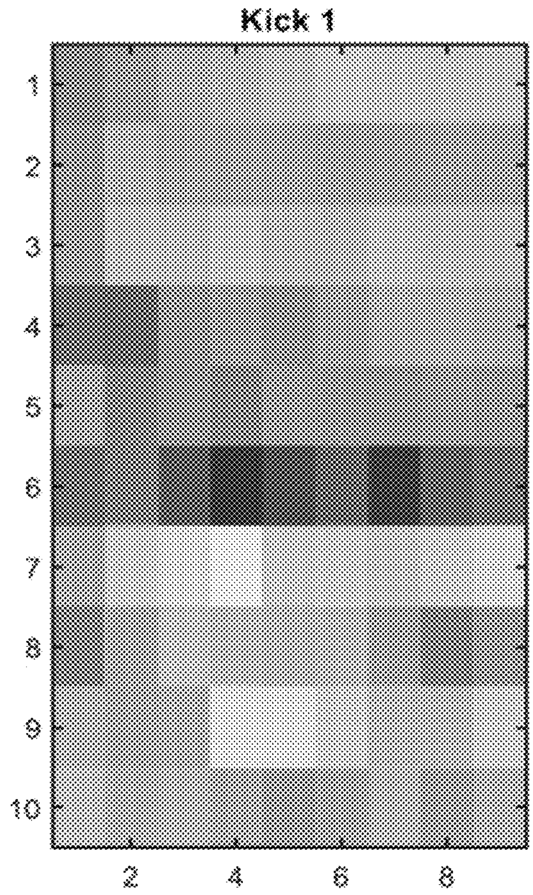

In some implementations, the neural network 200 may use one or more Mel-Frequency Cepstral Coefficient (MFCC) feature extraction layers which transform the audio signals, e.g., audio input, into images such that the neural network 200 can perform image classification. FIGS. 10 and 11 illustrate two feature extraction maps corresponding to two different snare percussion outputs, and FIGS. 12 and 13 illustrate two feature extraction maps corresponding to two different kick percussion outputs.

In general, the computing systems and/or devices described may employ any of a number of computer operating systems, including, but by no means limited to, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:

receive an audio input representing a percussion performed by a user; and classify, at a trained neural network, the audio input as a particular musical type, wherein the trained neural network comprises a convolutional neural network, wherein a number of inputs within an input layer of the convolutional neural network is equal to a number of recorded sounds corresponding to the audio input, wherein the number of inputs comprises at least two, wherein a first input of the at least two inputs corresponds to audio input representing a kick and a second input of the at least two inputs corresponds to audio input representing a snare.

2. The system as recited in claim 1, wherein the trained neural network maps audio input sequences representing the percussion to target musical instrument sequences.

3. The system as recited in claim 1, wherein the convolutional neural network comprises at least one dropout layer.

4. The system as recited in claim 1, wherein the processor is further programmed to receive the audio input from a microphone.

5. The system as recited in claim 1, wherein the processor is further programmed to perform audio envelope detection on the audio input prior to classification of the audio input.

6. The system as recited in claim 5, wherein the trained neural network is configured to transform the audio input into corresponding images, wherein the trained neural network is configured to classify the corresponding images into a particular musical type.

7. The system as recited in claim 6, wherein the trained neural network is configured to use Frequency Cepstral Coefficient (MFCC) feature extraction layers to transform the audio input into the corresponding images.

8. A method comprising:

receiving an audio input representing a percussion performed by a user; and classifying, at a trained neural network, the audio input as a particular musical type, wherein the trained neural network comprises a convolutional neural network, wherein a number of inputs within an input layer of the convolutional neural network is equal to a number of recorded sounds corresponding to the audio input, wherein the number of inputs comprises at least two, wherein a first input of the at least two inputs corresponds to audio input representing a kick and a second input of the at least two inputs corresponds to audio input representing a snare.

9. The method as recited in claim 8, wherein the trained neural network maps audio input sequences representing the percussion to target musical instrument sequences.

10. The method as recited in claim 8, wherein the convolutional neural network comprises at least one dropout layer.

11. The method as recited in claim 8, the method further comprising receiving the audio input from a microphone.

12. The method as recited in claim 8, the method further comprising performing audio envelope detection on the audio input prior to classification of the audio input.

13. The method as recited in claim 12, the method further comprising transforming the audio input into corresponding images, wherein the trained neural network is configured to classify the corresponding images into a particular musical type.

14. The method as recited in claim 13, wherein the trained neural network is configured to use Frequency Cepstral Coefficient (MFCC) feature extraction layers to transform the audio input into the corresponding images.

* * * * *